United States Patent
Kono et al.

(10) Patent No.: US 10,317,770 B2
(45) Date of Patent: Jun. 11, 2019

(54) MACH-ZEHNDER MODULATOR

(71) Applicant: SUMITOMO ELECTRIC INDUSTRIES, LTD., Osaka (JP)

(72) Inventors: Naoya Kono, Osaka (JP); Jun Otsuka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/135,503

(22) Filed: Sep. 19, 2018

(65) Prior Publication Data

US 2019/0094649 A1 Mar. 28, 2019

(30) Foreign Application Priority Data

Sep. 22, 2017 (JP) ................................. 2017-182466

(51) Int. Cl.
| | | |
|---|---|---|
| *G02B 6/125* | (2006.01) | |
| *G02B 6/12* | (2006.01) | |
| *G02F 1/225* | (2006.01) | |
| *G02F 1/21* | (2006.01) | |

(52) U.S. Cl.
CPC .......... *G02F 1/2257* (2013.01); *G02B 6/125* (2013.01); *G02B 2006/12142* (2013.01); *G02B 2006/12159* (2013.01); *G02F 2001/212* (2013.01)

(58) Field of Classification Search
CPC .......... G02B 6/125; G02B 2006/12142; G02B 2006/12159; G02F 1/011; G02F 1/025; G02F 1/0121; G02F 1/03; G02F 1/0305; G02F 1/0316; G02F 1/0327; G02F 1/0344; G02F 1/035; G02F 1/0356; G02F 1/2257; G02F 2001/212

See application file for complete search history.

(56) References Cited

U.S. PATENT DOCUMENTS

| | | | |
|---|---|---|---|
| 7,054,512 B2 * | 5/2006 | Sugiyama | .......... G02B 6/12007 385/131 |
| 7,088,875 B2 * | 8/2006 | Sugiyama | ............. G02F 1/2255 385/3 |
| 7,286,727 B2 * | 10/2007 | Sugiyama | ............... G02F 1/035 385/14 |

(Continued)

*Primary Examiner* — John Bedtelyon
(74) *Attorney, Agent, or Firm* — Smith, Gambrell & Russell, LLP.

(57) ABSTRACT

A Mach-Zehnder modulator includes: a first arm waveguide having first to third waveguide portions, the third waveguide portion being curved to couple the first and second waveguide portions with each other; a second arm waveguide having first to third waveguide portions, the third waveguide portion being curved to couple the first and second waveguide portions with each other, and a differential signal conductor having first and second signal conductors for driving the first and second arm waveguides, respectively. The first signal conductor has a first conductor portion and a first intersecting conductor portion connected thereto. The second signal conductor has a first conductor portion and a second intersecting conductor portion connected thereto. One of the first and second intersecting conductor portions includes an upper conducting layer, and the other includes a lower conducting layer. The upper conducting layer extends on the lower conducting layer apart therefrom.

9 Claims, 10 Drawing Sheets

(56) References Cited

U.S. PATENT DOCUMENTS

| | | | | |
|---|---|---|---|---|
| 7,471,853 B2* | 12/2008 | Sugiyama | ............. | G02F 1/0356 |
| | | | | 359/245 |
| 7,603,002 B2* | 10/2009 | Sugiyama | ............... | G02F 1/035 |
| | | | | 385/3 |
| 7,630,587 B2* | 12/2009 | Sugiyama | ............. | G02F 1/0356 |
| | | | | 385/2 |
| 7,801,400 B2* | 9/2010 | Sugiyama | ............ | G02B 6/1342 |
| | | | | 385/32 |
| 8,098,997 B2* | 1/2012 | Sugiyama | ............. | G02F 1/0356 |
| | | | | 398/183 |
| 9,036,954 B2* | 5/2015 | Kobrinsky | ............... | G02F 1/035 |
| | | | | 385/3 |
| 9,057,893 B2* | 6/2015 | Motoya | ................ | G02F 1/2255 |
| 9,140,955 B2* | 9/2015 | Hoffmann | ............... | G02F 1/025 |
| 2004/0184755 A1 | 9/2004 | Sugiyama et al. | | |
| 2009/0324165 A1* | 12/2009 | Sugiyama | ............ | G02B 6/1342 |
| | | | | 385/14 |

\* cited by examiner

MACH-ZEHNDER MODULATOR

BACKGROUND OF THE INVENTION

Field of the Invention

The present invention relates to a Mach-Zehnder modulator.

This application claims the benefit of priority from Japanese Patent Application No. 2017-182466 filed on Sep. 22, 2017, which is herein incorporated by reference in its entirety.

Related Background Art

US Publication No. 2004/0184755 (U.S. Pat. No. 7,054, 512), hereinafter referred to as Patent Document 1, discloses a modulator having curved ridge waveguides.

SUMMARY OF THE INVENTION

A Mach-Zehnder modulator according to one aspect of the present invention includes: a first arm waveguide having a first waveguide portion, a second waveguide portion and a third waveguide portion, the first waveguide portion extending in a direction of a first axis, the second waveguide portion extending in a direction of a second axis, and the third waveguide portion being curved so as to optically couple the first waveguide portion thereof to the second waveguide portion thereof; a second arm waveguide having a first waveguide portion, a second waveguide portion and a third waveguide portion, the first waveguide portion extending in the direction of the first axis, the second waveguide portion extending in the direction of the second axis, the third waveguide portion being curved so as to optically couple the first waveguide portion thereof to the second waveguide portion thereof, and the direction of the first axis being different from that of the second axis; and a differential signal line including a first signal conductor, a second signal conductor, and a reference potential conductor, the first signal conductor and the second signal conductor being coupled to drive the first arm waveguide and the second arm waveguide, respectively. The reference potential conductor has a first conductor portion extending in the direction of the first axis, and an intersecting conductor portion connected to the first conductor portion thereof. The first signal conductor has a first conductor portion extending in the direction of the first axis and connected to the first waveguide portion of the first arm waveguide, and a first intersecting conductor portion connected to the first conductor portion thereof. The second signal conductor has a first conductor portion extending in the direction of the first axis and connected to the first waveguide portion of the second arm waveguide, and a second intersecting conductor portion connected to the first conductor portion thereof. One of the first intersecting conductor portion and the second intersecting conductor portion has an upper conducting layer. The other of the first intersecting conductor portion and the second intersecting conductor portion has a lower conducting layer. The upper conducting layer extends on the lower conducting layer apart from the lower conducting layer.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

DESCRIPTION OF THE EMBODIMENTS

The modulator of Patent Document 1 is not driven by a differential signal. The modulator includes U-shaped inner and outer arm waveguides. The modulator further includes an inner ground plane, which is located between the two straight portions of the U-shaped inner arm waveguide and connected to the inner arm waveguide, a signal conductor, which is located outside the inner ground plane and connected to the outer arm waveguide, and an outer ground plane disposed outside the outer arm waveguide.

It is an object according to one aspect of the present invention to provide a Mach-Zehnder modulator that can reduce a signal skew on a differential signal line connected to a pair of arm waveguides each of which has a curved portion.

A description will be given of an embodiment.

A Mach-Zehnder modulator according to an embodiment includes: (a) a first arm waveguide having a first waveguide portion, a second waveguide portion and a third waveguide portion, the first waveguide portion extending in a direction of a first axis, the second waveguide portion extending in a direction of a second axis, and the third waveguide portion being curved so as to optically couple the first waveguide portion thereof to the second waveguide portion thereof; (b) a second arm waveguide having a first waveguide portion, a second waveguide portion and a third waveguide portion, the first waveguide portion extending in the direction of the first axis, the second waveguide portion extending in the direction of the second axis, the third waveguide portion being curved so as to optically couple the first waveguide portion thereof to the second waveguide portion thereof, and the direction of the first axis being different from that of the second axis; and (c) a differential signal line including a first signal conductor, a second signal conductor, and a reference potential conductor, the first signal conductor and the second signal conductor being coupled to drive the first arm waveguide and the second arm waveguide, respectively. The reference potential conductor has a first conductor portion extending in the direction of the first axis, and an intersecting conductor portion connected to the first conductor portion thereof. The first signal conductor has a first conductor portion extending in the direction of the first axis and connected to the first waveguide portion of the first arm waveguide, and a first intersecting conductor portion connected to the first conductor portion thereof. The second signal conductor has a first conductor portion extending in the direction of the first axis and connected to the first waveguide portion of the second arm waveguide, and a second intersecting conductor portion connected to the first conductor portion thereof. One of the first intersecting conductor portion and the second intersecting conductor portion has an upper conducting layer. The other of the first intersecting conductor portion and the second intersecting conductor portion has a lower conducting layer. The upper conducting layer extends on the lower conducting layer apart from the lower conducting layer.

The Mach-Zehnder modulator provides the first and second arm waveguides with respective curved portions which optically couple the first waveguide portions of the first and second arm waveguides to the second waveguide portions of the first and second arm waveguides, and the third waveguide portion in one of the first and second arm waveguides extends outside the third waveguide portion of the other of the first and second arm waveguides. The first and second signal conductors, which drive the first and second arm waveguides, respectively, cross each other with a grade separation of the first and second intersecting conductor portions. Specifically, one of the third conductor portions of the first and second signal conductors extends on the other to form a three-dimensional intersection of the signal conductors with the third conductor portions being separated from each other. This intersection of the signal conductors can determine the routing of the first and second signal conductors independently of outer and inner routings of the first and second arm waveguides. The grade separation of the signal conductors can reduce skew in the driving signals on the first and second signal conductors due to the difference in the outer and inner routing between the first and second arm waveguides.

In the Mach-Zehnder modulator according to an embodiment, the intersecting conductor portion and the first intersecting conductor portion cross with each other to build a grade separation of the first signal conductor and the reference potential conductor The Mach-Zehnder modulator is provided with the grade separation of the first and second signal conductors in which one of the intersecting conductor portion of the reference potential conductor and the first intersecting conductor portion of the first signal conductor runs over the other.

In the Mach-Zehnder modulator according to an embodiment, the intersecting conductor portion and the second intersecting conductor portion cross with each other to build a grade separation of the second signal conductor and the reference potential conductor.

The Mach-Zehnder modulator is provided with the grade separation of the second signal conductor and the reference potential conductor in which one of the intersecting conductor portion of the reference potential conductor and the second intersecting conductor portion of the second signal conductor runs over the other.

In the Mach-Zehnder modulator according to an embodiment, the first intersecting conductor portion of the first signal conductor extends in a direction of a third axis intersecting the direction of the first axis and the direction of the second axis to extend on the second arm waveguide and the second intersecting conductor portion of the second signal conductor.

The Mach-Zehnder modulator provides the second intersecting conductor portion of the second signal conductor with an extension that extends beyond an end of the first conductor portion of the first signal conductor in the direction of the first axis.

In the Mach-Zehnder modulator according to an embodiment, the second intersecting conductor portion of the second signal conductor has a part that extends from the first conductor portion of the first signal conductor in the direction of the third axis.

In the Mach-Zehnder modulator, the first signal conductor passes over the first and second arm waveguides to extend in the direction of the third axis while the second signal conductor extends in the direction of the third axis without extending on the first and second arm waveguides. The first signal conductor passes in the direction of the third axis longer than the second signal conductor to pass over the first and second arm waveguides.

In the Mach-Zehnder modulator according to an embodiment, the first intersecting conductor portion of the first signal conductor extends on the intersecting conductor portion of the reference potential conductor.

In the Mach-Zehnder modulator, the reference potential conductor extends in the direction of the first axis longer than the first signal conductor in the intersection region.

In the Mach-Zehnder modulator according to an embodiment, the intersecting conductor portion of the reference potential conductor has a part that extends on the second intersecting conductor portion of the second signal conductor in the direction of the third axis.

In the Mach-Zehnder modulator, the second intersecting conductor portion of the second signal conductor extends in the direction of the first axis to allow the intersection. The intersection region allows the second signal conductor to extend in the direction of the first axis longer than the reference potential conductor.

In the Mach-Zehnder modulator according to an embodiment, the second intersecting conductor portion of the second signal conductor has a part that extends on the intersecting conductor portion of the reference potential conductor in the direction of the first axis.

The Mach-Zehnder modulator is provided with the intersection region, which allows the second signal conductor to extend in the direction of the first axis longer than the reference potential conductor.

In the Mach-Zehnder modulator according to an embodiment, the first conductor portion of the first signal conductor, the first conductor portion of the reference potential conductor, and the first conductor portion of the second signal conductor are arranged to form an SGS structure.

The Mach-Zehnder modulator can provide the differential signal line with an SGS structure. The SGS structure includes a reference potential conductor extending inside between the first conductor portions of the first and second signal conductors, and includes no outer reference potential conductors running parallel to the first and second signal conductors.

Teachings of the present invention can be readily understood by considering the following detailed description with reference to the accompanying drawings shown as examples. Referring to the accompanying drawings, a Mach-Zehnder modulator according to an embodiment of the present invention will be described below. To facilitate understanding, identical reference numerals are used, where possible, to designate identical elements that are common to the figures.

Figure 1:
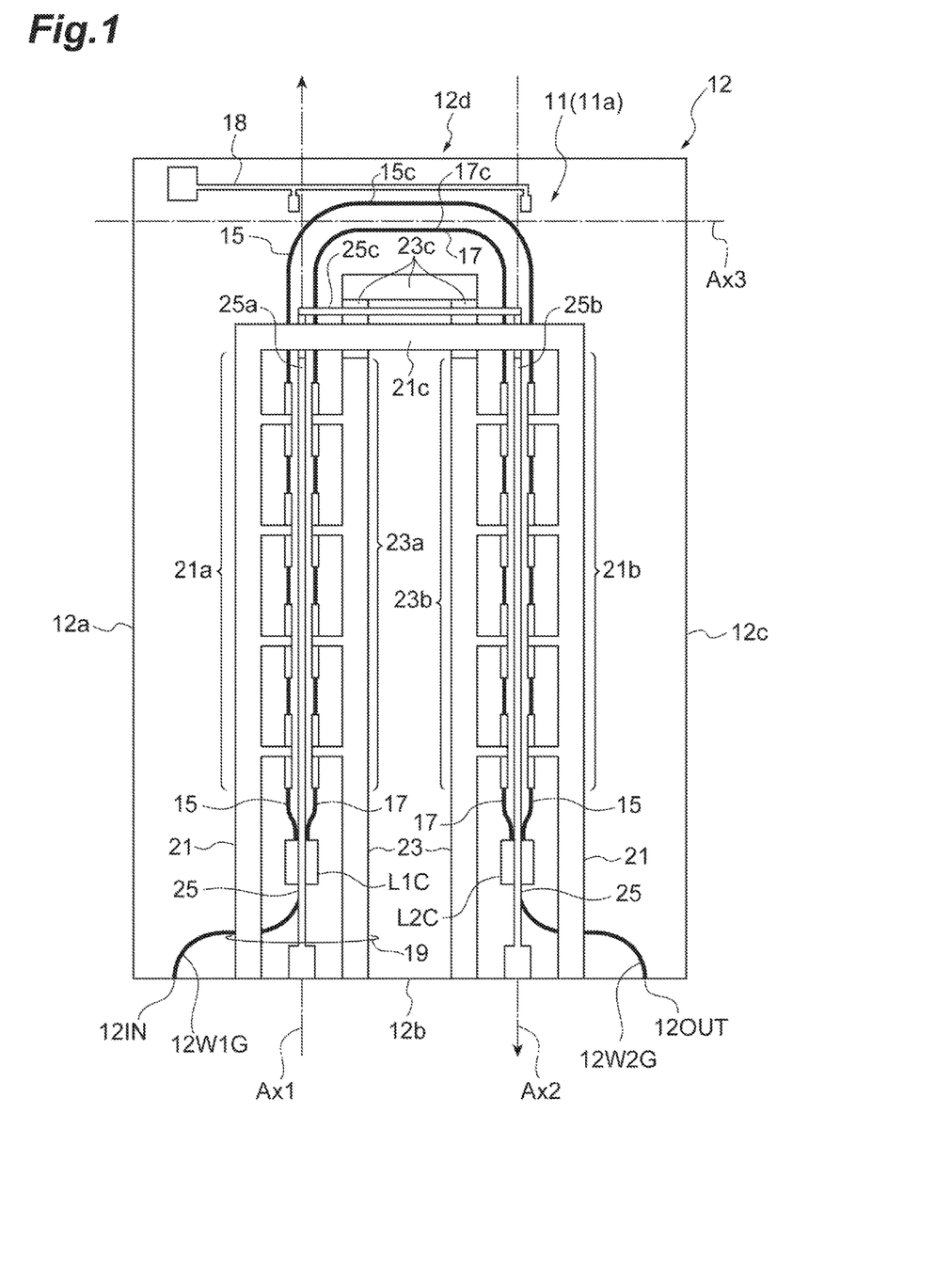
FIG. 1 is a schematic plan view showing a semiconductor device including a Mach-Zehnder modulator according to the embodiment.
Figure 2:
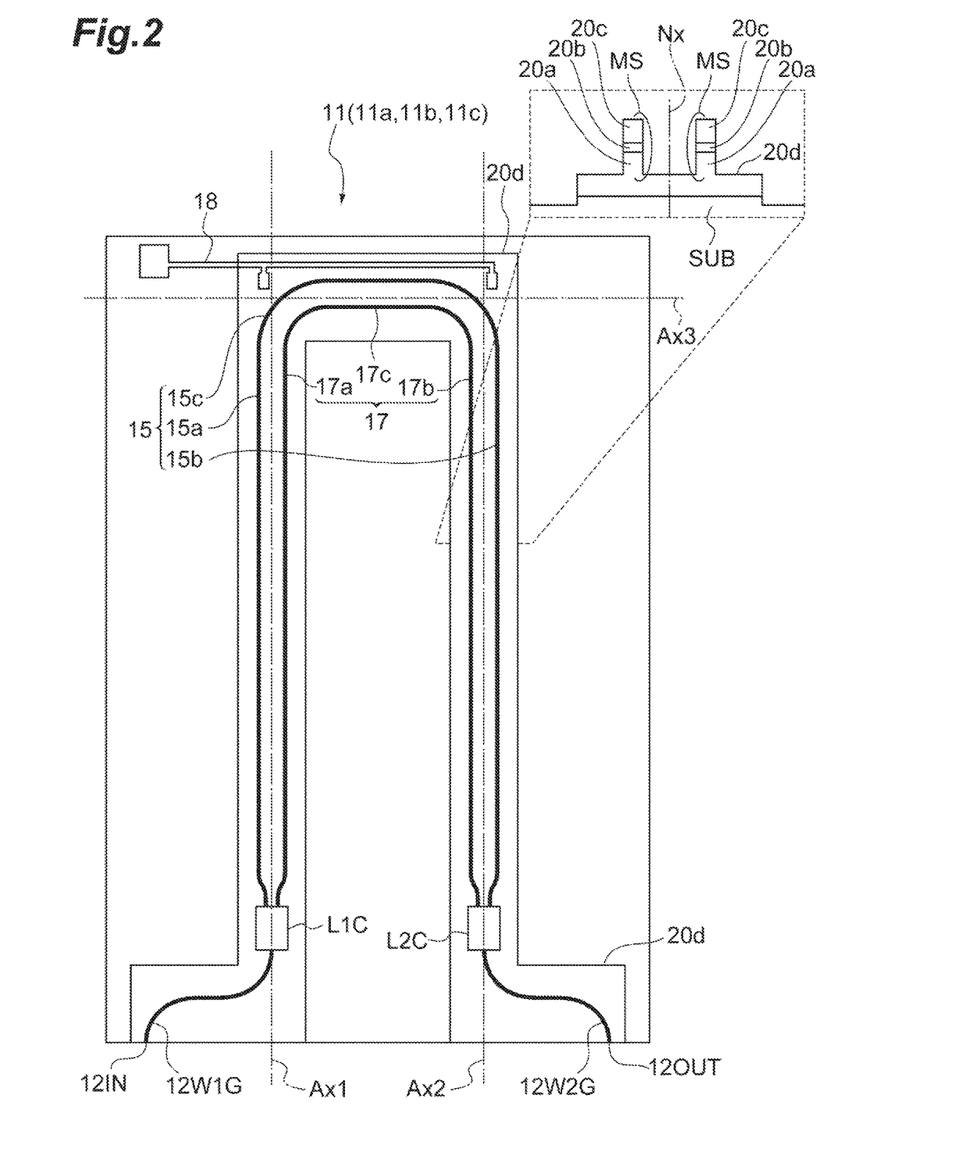
FIG. 2 is a schematic view showing a waveguide and a bottom semiconductor region of the Mach-Zehnder modulator according to the embodiment.
Figure 3:
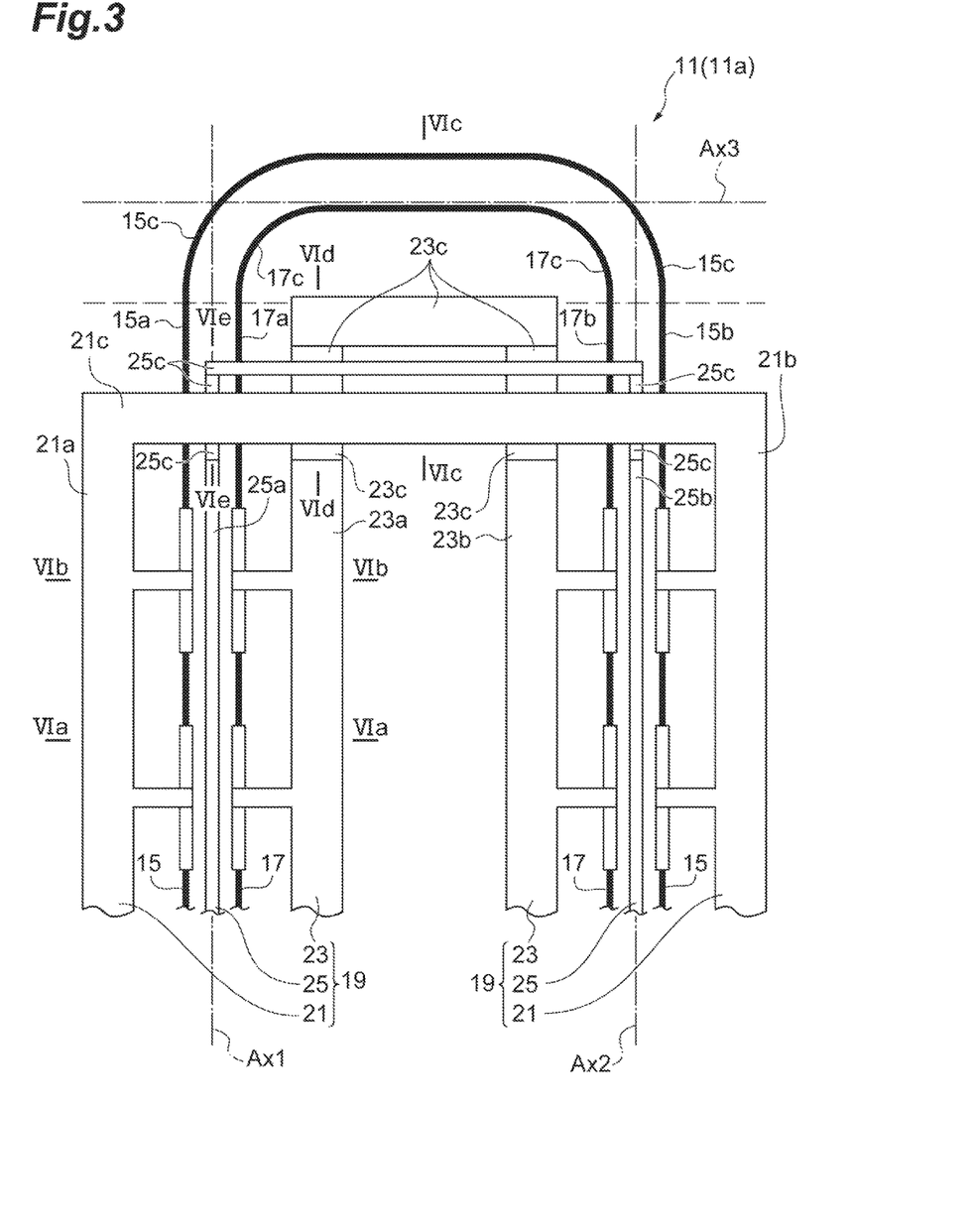
FIG. 3 is a schematic plan view showing the folded arm waveguides of the Mach-Zehnder modulator, as shown in FIG. 2, and a differential signal line for driving the arm waveguides.
Figure 4:
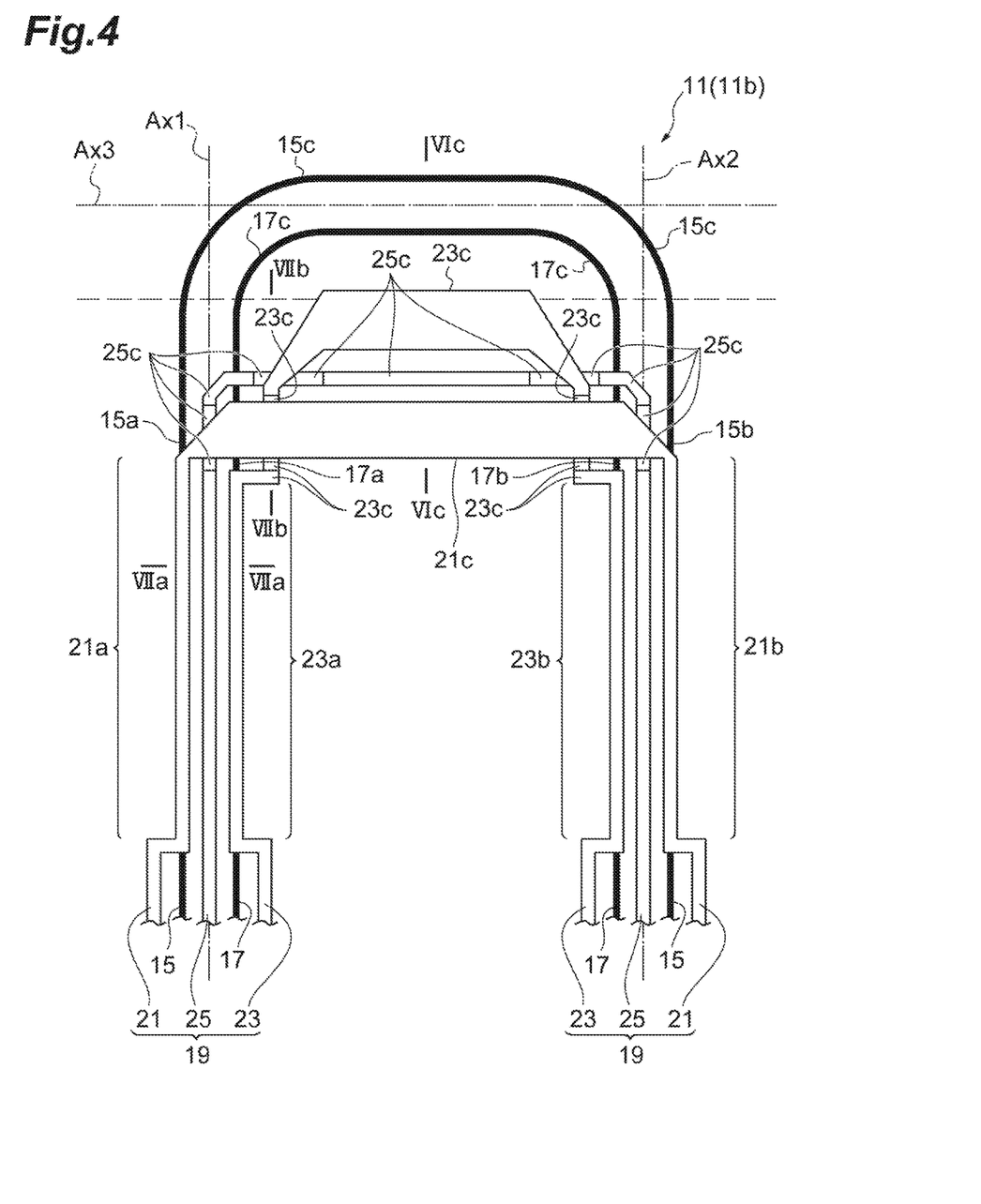
FIG. 4 is a schematic plan view showing the arm waveguides of the Mach-Zehnder modulator, as shown in FIG. 2, and another differential signal line for driving the arm waveguides.
Figure 5:
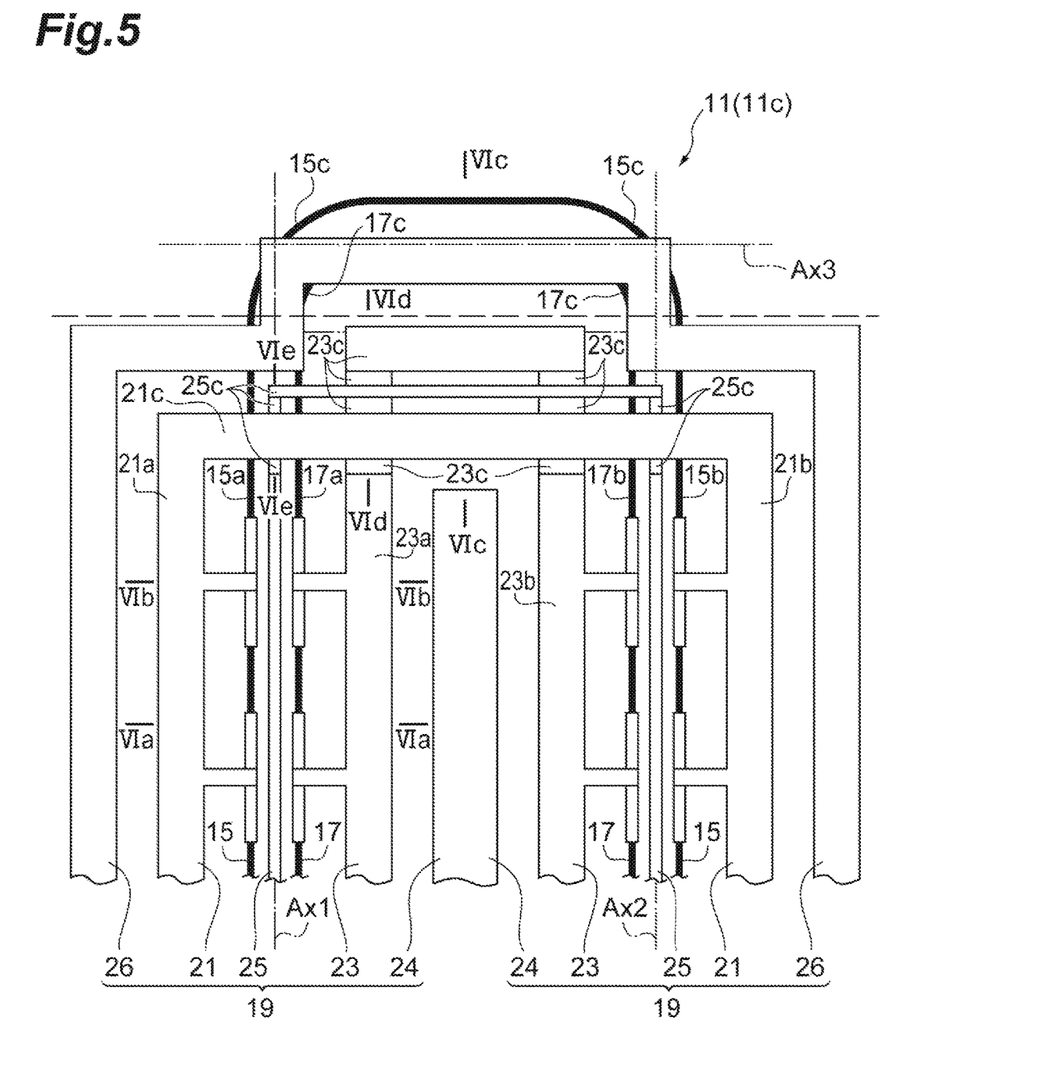
FIG. 5 is a schematic plan view showing the arm waveguides of the Mach-Zehnder modulator, as shown in FIG. 2, and still another differential signal line for driving the arm waveguides.

FIG. 1 is a schematic plan view showing a semiconductor device including the Mach-Zehnder modulator according to the embodiment. FIG. 2 is a schematic plan view showing the waveguides of the Mach-Zehnder modulator according to the embodiment. FIG. 3 is an enlarged schematic view showing the arm waveguides of the Mach-Zehnder modulator, shown in FIG. 2, and a differential signal line for driving the arm waveguides. FIG. 4 is a schematic plan view showing the arm waveguides of the Mach-Zehnder modulator, shown in FIG. 2, and another differential signal line for driving the arm waveguides. FIG. 5 is a schematic plan view showing the arm waveguides of the Mach-Zehnder modulator, shown in FIG. 2, and still another differential signal line for driving the arm waveguides. Referring to FIG. 1, there is shown a semiconductor device 12 including a Mach-Zehnder modulator 11 (11a, 11b, and 11c). The semiconductor device 12 has a chip with four sides 12a, 12b, 12c and 12d. The sides 12a and 12c extend in the direction of the first or second axis Ax1 or Ax2, and the sides 12b and 12d extend in the direction of the third axis Ax3.

Specifically, FIGS. 3, 4 and 5 show the respective Mach-Zehnder modulators 11 (11a, 11b, and 11c). A description will be given of the Mach-Zehnder modulator 11 with reference to FIGS. 1, 2 and 3 to 5 below. The Mach-Zehnder modulator 11 (11a, 11b, and 11c) includes a first arm waveguide 15, a second arm waveguide 17, and a differential signal line 19. As shown in FIG. 1, the Mach-Zehnder modulator 11 includes an optical coupler L1C and an optical coupler L2C, such as a multimode interference device. The optical coupler L1C is connected to ends of the first and second arm waveguides 15 and 17 and is connected to the input waveguide 12W1G to receive an input light beam from an input port 12IN. The optical coupler L1C is connected to the other ends of the first and second arm waveguides 15 and 17 and is connected to an output port 12OUT to provide an output light beam.

As shown in FIG. 2, the first arm waveguide 15 includes a first waveguide portion 15a, a second waveguide portion 15b, and a third waveguide portion 15c. The second arm waveguide 17 also includes a first waveguide portion 17a, a second waveguide portion 17b, and a third waveguide portion 17c. The first waveguide portion 15a and 17a of the first and second arm waveguides 15 and 17 extend in the direction of the directed first axis Ax1. The second waveguide portions 15b and 17b of the first and second arm waveguides 15 and 17 extend in the direction of the directed second axis Ax2. The third waveguide portion 15c is curved so as to optically couple the first waveguide portion 15a to the second waveguide portion 15b. In the second arm waveguide 17, the third waveguide portion 17c is curved so as to optically couple the first waveguide portion 17a to the second waveguide portion 17b.

As shown in FIG. 2, the first and second arm waveguides 15 and 17 each includes a part which has a substantial U shape in the embodiment. In the third waveguide portions 15c and 17c, the first arm waveguide 15 extends outside along the second arm waveguide 17, and the second arm waveguide 17 extends inside along the first arm waveguide 15. Specifically, in view of the direction of light propagation, the light beams in the first waveguide portions 15a and 17a of the first and second arm waveguides 15 and 17 propagate through the waveguide portions 15c and 17c to reach the second waveguide portions 15b and 17b of the first and second arm waveguides 15 and 17, and the waveguide portions 15c and 17c are bent such that the direction of the first waveguide portions 15a and 17a forms an angle of 180 degrees with that of the second waveguide portions 15b and 17b so as to change the direction of propagating light beams. The routing of the first and second arm waveguides 15 and 17 according to the present embodiment is not limited to the exemplary routing. The direction of the first and second waveguide portions 15a and 17a forms an angle, which is larger than zero degrees and equal to 180 degrees or less, with the direction of the second waveguide portions 15b and 17b, and the angle can be, for example, 45, 90, 120, 150, or 180 degrees.

As shown in FIG. 2, the semiconductor mesa MS in each of the first and second arm waveguides 15 and 17 includes a lower conductive region 20a (for example, a lower cladding region), a core region 20b, and an upper conductive region 20c, which are arranged in a direction crossing the principal face of the base SUB, for example, the direction of the axis Nx normal to the principal face thereof. The semiconductor mesa MS is disposed on the device isolation mesa 20d made of a conductive semiconductor. The semiconductor mesas MS of the first and second arm waveguides 15 and 17 are electrically connected via the device isolation mesa 20d. If necessary, the device isolation mesa 20d can receive an external voltage, and the metal conductive layer 18 shown in FIG. 2 can be connected to the device isolation mesa 20d to feed the external potential.

Exemplary Waveguide Structure
Lower conductive region 20a: n-type InP.
Core region 20b: undoped AlGaInAs multiple quantum well.
Upper conductive region 20c: p-type InP.

As shown in FIGS. 1 and 3 to 5, the differential signal line 19 includes a first signal conductor 21, a second signal conductor 23, and a reference potential conductor 25. The first and second signal conductors 21 and 23 transmit electrical signals to drive the first and second arm waveguides 15 and 17, respectively. The reference potential conductor 25 provides the reference electrical plane of the differential signal conductor 19.

The first signal conductor 21 includes a first conductor portion 21a, a second conductor portion 21b, and a first intersecting conductor portion 21c. The first conductor portion 21a extends in the direction of the first axis Ax1 along the first waveguide portion 15a of the first arm waveguide 15, and is connected to the first waveguide portion 15a of the first arm waveguide 15. The first intersecting conductor portion 21c connects the first conductor portion 21a to the second conductor portion 21b.

The second signal conductor 23 includes a first conductor portion 23a, a second conductor portion 23b, and a second intersecting conductor portion 23c. The first conductor portion 23a extends in the direction of the first axis Ax1 along the first waveguide portion 17a of the second arm waveguide 17 and is connected to the first waveguide portion 17a. The second intersecting conductor portion 23c connects the second conductor portion 23b to the first conductor portion 23a.

The first intersecting conductor portion 21c of the first signal conductor 21 and the second intersecting conductor portion 23c of the second signal conductor 23 are arranged in the direction of the normal axis Nx such that one of the first and second intersecting conductor portions 21c and 23c is apart from the other to form a grade separation of the first signal conductor 21 and the second signal conductor 23.

The Mach-Zehnder modulator 11 (11a, 11b, and 11c) provides the first and second arm waveguides 15 and 17 with respective curved portions which optically couple the first waveguide portions 15a and 17a of the first and second arm waveguides 15 and 17 with the second waveguide portions 15b and 17b of the first and second arm waveguides 15 and 17, and the third waveguide portion (15c or 17c) in one of the first and second arm waveguides 15 and 17 extends outside the third waveguide portion (17c or 15c) of the other of the first and second arm waveguides 15 and 17. The first and second signal conductors 21 and 23, which drive the first and second arm waveguides 15 and 17, respectively, cross each other using a grade separation of the first and second intersecting conductor portions 21c and 23c. Specifically, one of the third conductor portions 21c and 23c of the first and second signal conductors 21 and 23 extends on the other with the third conductor portions 21c and 23c being separated from each other to form a three-dimensional intersection of the signal conductors (21 and 23). These intersections of the signal conductors (21 and 23) allows the routing of the first and second signal conductors 21 and 23 independently of the outer and inner routing of the first and second arm waveguides 15 and 17. The grade separation of the signal conductors (21 and 23) can reduce skew in the driving signal components on the first and second signal conductors 21 and 23 due to the difference in outer and inner routing between the first and second arm waveguides 15 and 17.

The reference potential conductor 25 includes a first conductor portion 25a, a second conductor portion 25b, and an intersecting conductor portion 25c. The first conductor portion 25a extends between the first conductor portions 21a and 23a of the first and second signal conductors 21 and 23.

In the first signal conductor 21, the second conductor portion 21b is connected to the second waveguide portion 15b of the first arm waveguide 15, and extends along the second waveguide portion 15b, specifically in the direction of the second axis Ax2 in the present embodiment. In the second signal conductor 23, the second conductor portion 23b is connected to the second waveguide portion 17b of the second arm waveguide 17, and extends along the second waveguide portion 17b of the second arm waveguide 17, specifically in the direction of the second axis Ax2 in the present embodiment.

The Mach-Zehnder modulator 11 (11a, 11b, and 11c), as shown in FIGS. 3 to 5, allows the first conductor portions 21a, 25a and 23a of the first signal conductor 21, the reference potential conductor 25, and the second signal conductor 23 to extend from the side 12a in the direction from the sides 12a to 12c of the semiconductor device 12, specifically in the direction of the first axis Ax1 in the embodiment. The first conductor portions 21a, 25a and 23a extend along the first waveguide portions 15a and 17a of the first and second arm waveguides 15 and 17 to form the differential transmission line 19. The differential signal conductor 19 is folded in accordance with that of the first and second folded arm waveguides 15 and 17. The second conductor portions 21b, 25b and 23b of the first signal conductor 21, the reference potential conductor 25, and the second signal conductor 23 extend in the direction from the sides 12c to 12a of the semiconductor device 12, specifically in the direction of the second axis Ax2, to reach the side 12c. The second conductor portions 21b, 25b and 23b extends along the second waveguide portions 15b and 17b of the first and second arm waveguides 15 and 17 to form a differential transmission line. The differential signal line 19 provides the folded portion with a structure including multilayered conductive layers, which can suppress the generation of the common mode in the differential signal and reduce skew in the electrical signal.

In the present embodiment, the first signal conductor 21 can be bent in the first intersection, which can switch from the outer conductor (the first conductor portion 21a) extending in the direction of the first axis Ax1 to the inner conductor (the first intersecting conductor portion 21c) extending in the direction of the third axis Ax3, and can be bent in the second intersection, which can switch from the inner conductor (the first intersecting conductor portion 21c) to the outer conductor (the second conductor portion 21b) extending in the direction of the second axis Ax2. Likewise, the second signal conductor 23 can be bent in the first intersection, which can switch from the inner conductor (the first conductor portion 23a) extending in the direction of the first axis Ax1 to the outer conductor (the first intersecting conductor portion 23c) extending in the direction of the third axis Ax3, and can be bent in the second intersection, which can switch from the outer conductor (the first intersecting conductor portion 23c) to the inner conductor (the second conductor portion 23b) extending in the direction of the second axis Ax2.

Specifically, the first intersecting conductor portion 21c extends straight beyond the end of the second intersecting conductor portion 23c in the direction of the third axis Ax3 such that the outer first conductor portion 21a is connected to the outer second conductor portion 21b therethrough. In addition, the second intersecting conductor portion 23c has one part, which extends in the direction of the first axis Ax1, crossing the first intersecting conductor portion 21c in the first intersection to switch from the inner conductor (the second portion of the second intersecting conductor 23c) to the outer conductor (the first portion of the second intersecting conductor portion 23c) extending in the direction of the third axis Ax3, and has another part, which extends in the direction of the first axis Ax2, crossing the first intersecting conductor portion 21c in the second intersection to switch from the outer conductor (the first portion of the second intersecting conductor portion 23c) to the inner conductor (the third portion of the second intersecting conductor portion 23c). The second intersecting conductor portion 23c has respective extensions (the second and third portions), which extend in the directions of the first and second axes Ax1 and Ax2, to enable the first and second intersections, and the second and third portions can be used to make the difference in length between the first portions of the second intersecting conductor portion 23c and the first intersecting conductor portion 21c reduced. The crossing structure, which uses multiple intersections (for example, the first and second intersections) each of which is provided by the multilayer interconnection, can reduce the difference in length between the inner and outer transmitting conductors, and keeps the differential transmission path by switching between the inner and outer conductors.

Referring to FIGS. 3, 4 and 5, the Mach-Zehnder modulator 11 (11a, 11b, and 11c) allows the second intersecting conductor portion 23c of the second signal conductor 23 to extend in the direction of the third axis Ax3 to the second conductor portion 23b without extending on the first arm waveguide 15 (and the second arm waveguide 17 in the present embodiment). In addition, the first intersecting conductor portion 21c of the first signal conductor 21 extends in the direction of the third axis Ax3 to pass on the second arm waveguide 17 twice, and to pass on the first arm waveguide 15 in this embodiment, while the second intersecting conductor portion 23c of the second signal conductor 23 extends in the direction of the third axis Ax3 without passing on the first and second arm waveguides 15 and 17. Preferably, the first intersecting conductor portion 21c extends in the direction of the third axis Ax3 longer than the second intersecting conductor portion 23c (the first portion extending in the direction of the third axis Ax3) to pass over the first arm waveguide 15 (15a and 15b) and the second arm waveguide 17 (17a and 17b).

Referring to FIGS. 3, 4 and 5, the first and second arm waveguides 15 and 17 have respective multiple portions which extend from the first conductor portions (21a and 23a), curved at an angle larger than zero, for example twice at an angle of 90 degrees in the present embodiment, so that the differential signal line 19 is folded in accordance with change in the routing of the folded arm waveguides. Specifically, in the first signal conductor 21 of the Mach-Zehnder modulator 11 (11a, 11b, and 11c), the first intersecting conductor portion 21c, adjoining to the conductor portion 21a, extends in the direction of the third axis Ax3, which intersects that of the first axis Ax1, on the second arm waveguide 17 and the second intersecting conductor portion 23c of the second signal conductor 23, further on the first arm waveguide 15 in the present embodiment, and reaches the second conductor portion 21b, which extends in the direction of the second axis Ax2 intersecting that of the third axis Ax3. In the second signal conductor 23, the second intersecting conductor portion 23c extends beyond the end of the first conductor portion 21a in the direction of the first axis Ax1 so as to extend on the first intersecting conductor portion 21c that extends outside from the end of the first conductor portion 21a in the direction of the third axis Ax3, and extends along the third intersecting conductor portion 21c in the direction of the third axis Ax3 by changing the direction of the conductor from the first axis Ax1 to the third axis Ax3. The second intersecting conductor portion 23c further extends in the direction of the second axis Ax2 so as to extend on the first intersecting conductor portion 21c toward the second conductor portion 21b by changing the direction of the conductor from the third axis Ax3 to the second axis Ax2 and reach the second conductor portion 23b.

Referring to FIGS. 3, 4 and 5, one of the intersecting conductor portion 25c of the reference potential conductor 25 and the first intersecting conductor portion 21c of the first signal conductor 21 runs over the other to form a grade separation. The grade separation allows the reference potential conductor 25 and the first signal conductor 21 to intersect each other in a three dimensional manner. Specifically, the grade separation between the first signal conductor 21 and the reference potential conductor 25 allows one of the intersecting conductor portion 25c and the first intersecting conductor portion 21c to extend on the other.

Referring to FIGS. 3, 4 and 5, one of the intersecting conductor portion 25c of the reference potential conductor 25 runs over the second intersecting conductor portion 23c of the second signal conductor 23 to form a grade separation. The grade separation between the second signal conductor 23 and the reference potential conductor 25 allows the intersecting conductor portion 25c and the second intersecting conductor portion 23c to intersect each other in a three-dimensional manner. Specifically, the grade separation between the second signal conductor 23 and the reference potential conductor 25 allows one of the intersecting conductor portion 25c and the second intersecting conductor portion 23c to extend on the other.

Referring to FIGS. 3, 4 and 5, the first intersecting conductor portion 21c of the first signal conductor 21 extends on the intersecting conductor portion 25c of the reference potential conductor 25 to reach the second conductor portion 21b of the first signal conductor 21. The reference potential conductor 25 extends in the direction of the first axis Ax1 longer than the first signal conductor 21 in the intersection region.

Referring to FIGS. 3 and 5, the intersecting conductor portion 25c of the reference potential conductor 25 extends in the direction of the third axis Ax3 so as to extend on the second intersecting conductor portion 23c of the second signal conductor 23, and reaches the second conductor portion 25b of the reference potential conductor 25. In the intersecting region, the second intersecting conductor portion 23c extends in the direction of the first axis Ax1, and the second signal conductor 23 further extends beyond the end of the first conductor portion 25a of the reference potential conductor 25 in the direction of the first axis Ax1.

Referring to FIG. 4, the second intersecting conductor portion 23c of the second signal conductor 23 extends in the direction of the first axis Ax1 on the intersecting conductor portion 25c of the reference potential conductor 25, and reaches the conductor portion 23b of the second signal conductor 23. The second signal conductor 23 extends in the direction of the first axis Ax1 beyond the end of the first conductor portion 25a of the reference potential conductor 25 in the grade separation region.

A description will be given of the Mach-Zehnder modulators 11a and 11c below. FIGS. 6A, 6B, 6C, 6D and 6E are cross sectional views, taken lines VIa-VIa, VIb-VIb, VIc-VIb, VId-VId, and VIe-VIe shown in FIG. 3, respectively. The semiconductor mesa MS is embedded with an insulating material, which includes a resin body RSN and silicon-based inorganic insulating films (SNF1, SNF2, and SNF3). The Mach-Zehnder modulators 11a and 11c each are provided with a traveling-wave type differential signal path 19.

Figure 6A:
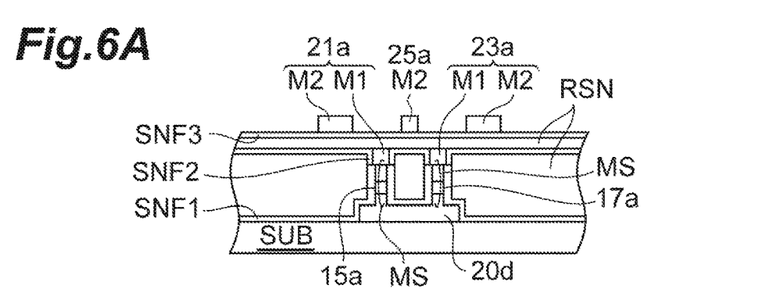
FIG. 6A is a cross sectional view taken along line VIa-VIa shown in FIG. 3.

Referring to FIG. 6A, a lower conducting layer M1 extends on the semiconductor mesa MS embedded with the insulating material, and the lower conducting layer M1 makes contact with the top of the semiconductor mesa MS covered with the insulating material. An upper conductor layer M2, which is different from the lower conductor layer M1 in level, extends on the embedding insulator. Lower and upper conductor layers M1 and M2 that are associated with one semiconductor mesa MS constitute the first signal conductor 21. Lower and upper conductor layers M1 and M2 that are associated with the other semiconductor mesa MS constitute the second signal conductor 23. An upper conductor layer M2 constitutes the reference potential conductor 25 extending between the first and second signal conductors 21 and 23. The first signal conductor 21, the reference potential conductor 25 and the second signal conductor 23 are arranged in order on the insulating material.

Figure 6B:
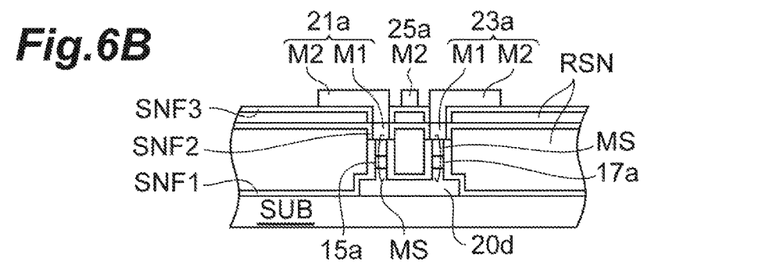
FIG. 6B is a cross sectional view taken along line VIb-VIb shown in FIG. 3.

Referring to FIG. 6B, a lower conductor layer M1 extends on the semiconductor mesa MS embedded with the insulating material to be connected to an upper conductor layer M2 via a through hole. Lower and upper conductor layers M1 and M2 associated with one semiconductor mesa MS constitute the first signal conductor 21. Lower and upper conductor layers M1 and M2 associated with the other semiconductor mesa MS constitute the second signal conductor 23. An upper conductor layer M2 constitutes the reference potential conductor 25 extending between the first signal conductors 21 and 23. The first signal conductor 21, the reference potential conductor 25 and the second signal conductor 23 are arranged in order on the insulating material.

Figure 6C:
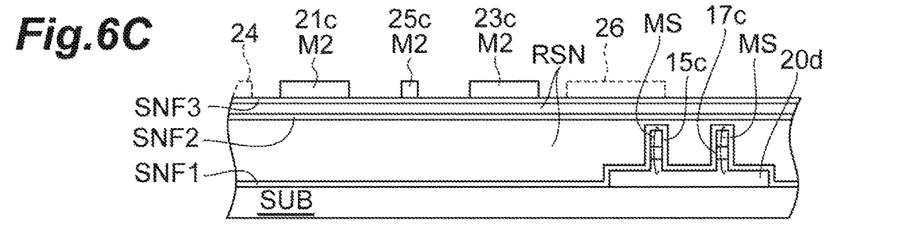
FIG. 6C is a cross sectional view taken along line VIc-VIc shown in FIGS. 3 and 4.

Referring to FIG. 6C, three upper conductor layers M2 extend on an insulating material apart from the semiconductor mesa MS embedded with the insulating material. The first signal conductor 21, the reference potential conductor 25 and the second signal conductor 23 are arranged in order on the insulating material.

Figure 6D:
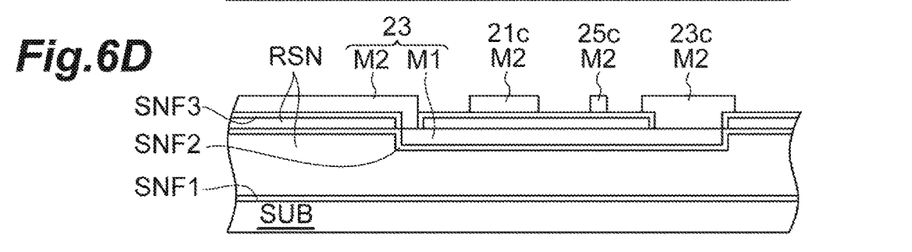
FIG. 6D is a cross sectional view taken along line VId-VId shown in FIG. 3.

Referring to FIG. 6D, an insulating material that is away from the semiconductor mesa MS embedded therewith allows the first intersecting conductor portion 21c (an upper conductor layer M2) of the first signal conductor 21 and the intersecting conductor portion 25c (an upper conductor layer M2) of the reference potential conductor 25 to overpass the second intersecting conductor portion 23c (the lower conductor layer M1) of the second signal conductor 23, thereby providing a structure that can construct a grade separation between the second signal conductor 23, and the first signal and reference potential conductors 21 and 25. A similar structure can construct a grade separation between the first signal conductor 21 and the second signal and reference potential conductors 23 and 25, and a grade separation between the reference potential conductor 25 and the first and second signal conductors 21 and 23.

Figure 6E:
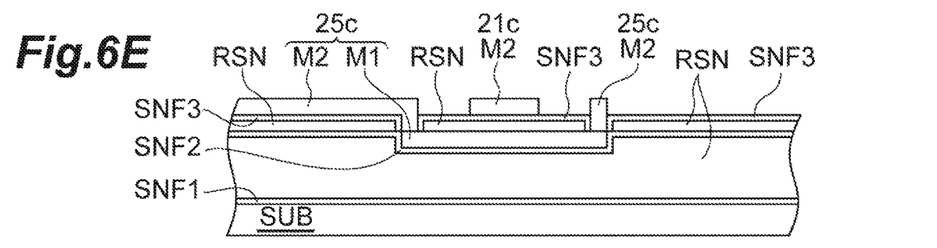
FIG. 6E is a cross sectional view taken along line VIe-VIe shown in FIG. 3.

Referring to FIG. 6E, an insulating material that is away from the semiconductor mesa MS embedded therewith allows the first intersecting conductor portion 21c (an upper conductor layer M2) of the first signal conductor 21 to overpass the intersecting conductor portion 25c (a lower conductor layer M1) of the reference potential conductor 25, thereby providing a structure that can construct a grade separation between of the first signal conductor 21 and the reference potential conductor 25. A similar structure can construct a grade separation of the second signal conductor 23 and the reference potential conductor 25.

Figure 7A:
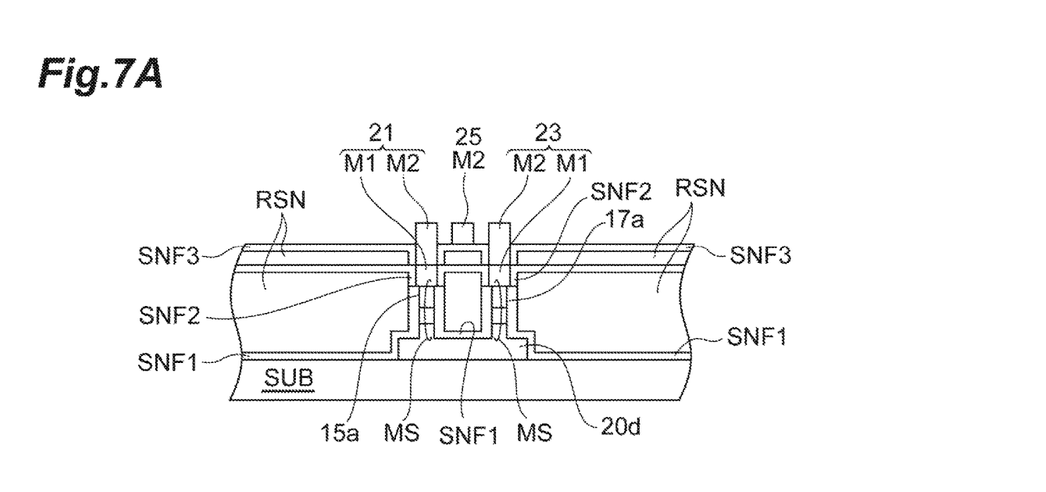
FIG. 7A is a cross sectional view taken along line VIIa-VIIa shown in FIG. 4.
Figure 7B:
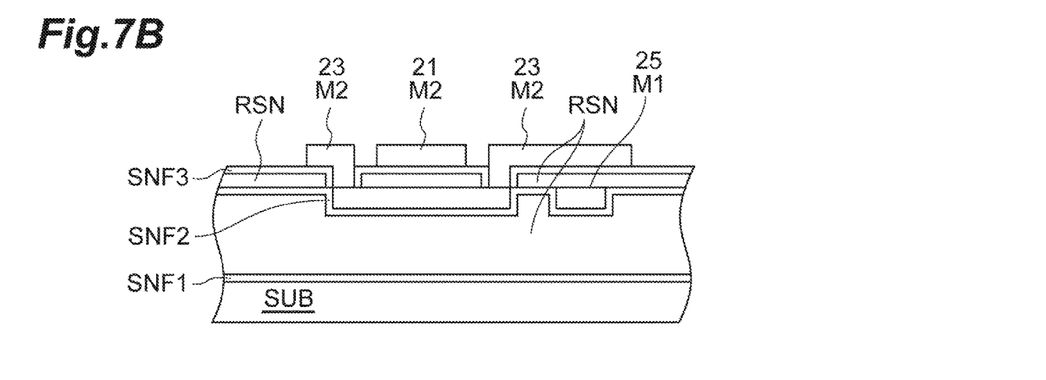
FIG. 7B is a cross sectional view taken along line VIIb-VIIb shown in FIG. 4.

A description will be given of the Mach-Zehnder modulator 11b below. FIGS. 7A and 7B are cross sectional views taken along lines VIIa-VIIa and VIIb-VIIb shown in FIG. 4, respectively.

Referring to FIG. 7A, a lower conductor layer M1 extends on the semiconductor mesa MS embedded with an insulating material to be connected to an upper conductor layer M2 through a through hole of the insulating material. Lower and upper conductor layers M1 and M2 associated with one semiconductor mesa MS constitute the first signal conductor 21. Lower and upper conductor layer M1 and M2 associated with the other semiconductor mesa MS constitute the second signal conductor 23. The differential signal line 19 extends on the first and second waveguide portions 15a and 15b of the first arm waveguide 15 and on the first and second waveguide portions 17a and 17b of the second arm waveguide 17. An upper conductor layer M2 for the reference potential conductor 25 extends between the first and second signal conductors 21 and 23. The first signal conductor 21, the reference potential conductor 25 and the second signal conductor 23 are arranged in order on the insulating material, Referring to FIG. 7B, an insulating material that is away from the semiconductor mesa MS embedded therewith allows the first intersecting conductor portion 21c (an upper conductor layer M2) of the first signal conductor 21 to overpass the second intersecting conductor portion 23c (a lower conductor layer M2) of the second signal conductor 23 and allows the second intersecting conductor portion 23c (an upper conductor layer M2) of the second signal conductor 23 to overpass the conductor portion 25c (a lower conductor layer M1) of the reference potential conductor 25, thereby constructing a grade separation of the first signal conductor 21, the reference potential conductor 25, and the second signal conductor 23.

Figure 8:
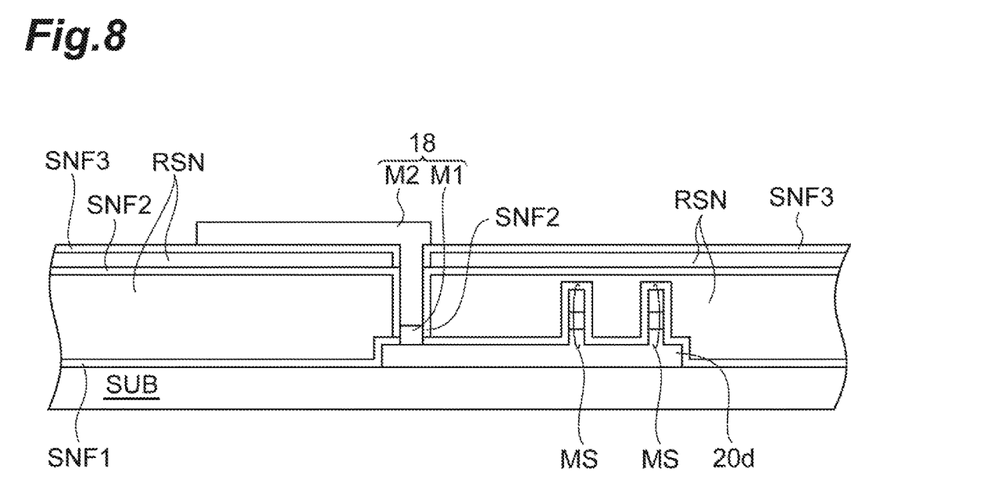
FIG. 8 is a cross sectional view showing an electrical connection to the device isolation mesa in the Mach-Zehnder modulator.

As shown in FIG. 8, the device isolation mesa 20d may be fed by use of upper and lower layer metal layers (for example, upper and lower conductor layers M2 and M1).

In the Mach-Zehnder modulator 11 (11a, 11b, and 11c), the first conductor portions 21a, 23a, and 25a and the second conductor portions 21b, 23b, and 25b each are preferably provided with an upper conductor layer M2. The first intersecting conductor portion 21c, the second intersecting conductor portion 23c, and the intersecting conductor portion 25c each are provided with a lower conductor layer M1 and/or an upper conductor layer M2.

Specifically, one of the first and second intersecting conductor portions 21c and 23c of the first and second signal conductors 21 and 23 includes an upper conductor layer M2, and the other includes lower and upper conductor layers M1 and M2. The upper conductor layer M2 can overpass the lower conductor layer M1 away therefrom to construct a grade separation of the first and second signal conductors 21 and 23.

The outer signal conductor, for example, the first signal conductor 21 in the embodiment may include an upper conductor layer M2. The intersecting conductor portion 25c of the reference potential conductor 25 preferably extends on one of above and under the first and second intersecting conductor portions 21c and 23c of the first and second signal conductors 21 and 23 with the first and second intersecting conductor portions 21c and 23c separated from the intersecting conductor portion 25c, thereby constructing a grade separation of the first and second signal conductors 21 and 23 and the reference potential conductor 25. The second intersecting conductor portion 23c may include an intersecting conductor layer having a lower conductor layer M1 and/or an upper conductor layer M2. The second intersecting conductor portion 23c passes on one of above and under the first intersecting conductor portion 21c and the intersecting conductor portion 25c with the first intersecting conductor portion 21c and the intersecting conductor portion 25c separated from the second intersecting conductor portion 23c, thereby constructing a grade separation of the first signal and reference potential conductors 21 and 25 and the second signal conductor 23.

As understood from the sectional structure shown in FIGS. 6A to 6E, FIGS. 7A and 7B and FIG. 8, the multilayer interconnecting structure for the Mach-Zehnder modulator 11 is provided by the following process. The application of photolithography and etching to a semiconductor laminate having a desired epitaxial layer structure forms a semiconductor mesa MS and a device isolation mesa 20d. Thereafter, a first silicon-based inorganic insulating film is deposited onto the first silicon-based inorganic insulating film, and a first BCB resin is applied thereon. A first opening is formed in the cured first BCB resin body to define an area in which the lower conductor layer is to be formed. The first opening is used as a part of a through hole to the top face of the semiconductor mesa MS. After forming the first opening, a second silicon-based inorganic insulating film is deposited on the first BCB resin body, and an opening is formed in the second silicon-based inorganic insulating film. After forming the opening in the second silicon-based inorganic insulating film, a lower conductor layer M1 is formed thereon. A second BCB resin is applied on the lower conductor layer M1 and the second silicon-based inorganic insulating film so as to embed the lower conductor layer M1. A second opening is formed in the cured second BCB resin body to form a through hole to the lower conductor layer M1. After forming the second opening, a third silicon-based inorganic insulating film is deposited on the second BCB resin body, and an opening is formed in the third silicon-based inorganic insulating film. After forming the opening in the third silicon-based inorganic insulating film, the upper conductor layer M2 is formed thereon.

A description will be given of the Mach-Zehnder modulators 11a and 11b. As shown in FIGS. 3 and 4, the first conductor portion 21a of the first signal conductor 21, the first conductor portion 25a of the reference potential conductor 25, and the first conductor portion 23a of the second signal conductor 23 are arranged to provide the differential signal line 19 with an SGS structure.

The SGS structure of the differential signal line 19 provides each of the Mach-Zehnder modulators 11a and 11b with the first conductor portion 21a (21b) of the first signal conductor 21, the first conductor portion 23a (23b) of the second signal conductor 23, and the reference potential conductor 25 extending between the first and second signal conductors 21 and 23, and does not include any reference potential conductors that run outside of the first and second signal conductors 21 and 23 parallel thereto. The SGS structure allows a differential signal on the first and second signal conductors 21 and 23 to produce a virtual ground plane on the reference potential conductor 25.

A description will be given of the Mach-Zehnder modulator 11c below. As shown in FIG. 5, the differential signal line 19 includes a first reference potential conductor 24 and a second reference potential conductor 26. The first conductor portion 21a of the first signal conductor 21 extends between the reference potential conductor 25 and the first reference potential conductor 24, and the first conductor portion 23a of the second signal conductor 23 extends between the reference potential conductor 25 and the second reference potential conductor 26. The Mach-Zehnder modulator 11c provides the differential signal line 19 with a GSGSG structure which has a reference potential conductor 25 extending between the first and second signal conductors 21 and 23 parallel to the conductor portion 21a (21b) and the conductor portion 23a (23b), and a first reference potential conductor 24 and a second reference potential conductor 26 which run outside of the first and second signal conductors 21 and 23 in parallel thereto, respectively.

The structure of the differential signal path 19 is not limited to the SGS and GSGSG structures, but the differential signal path 19 may have a GSSG structure formed by removing, from the GSGSG structure, the reference potential conductor 25 extending between the first and second signal conductors 21 and 23.

Figure 9:
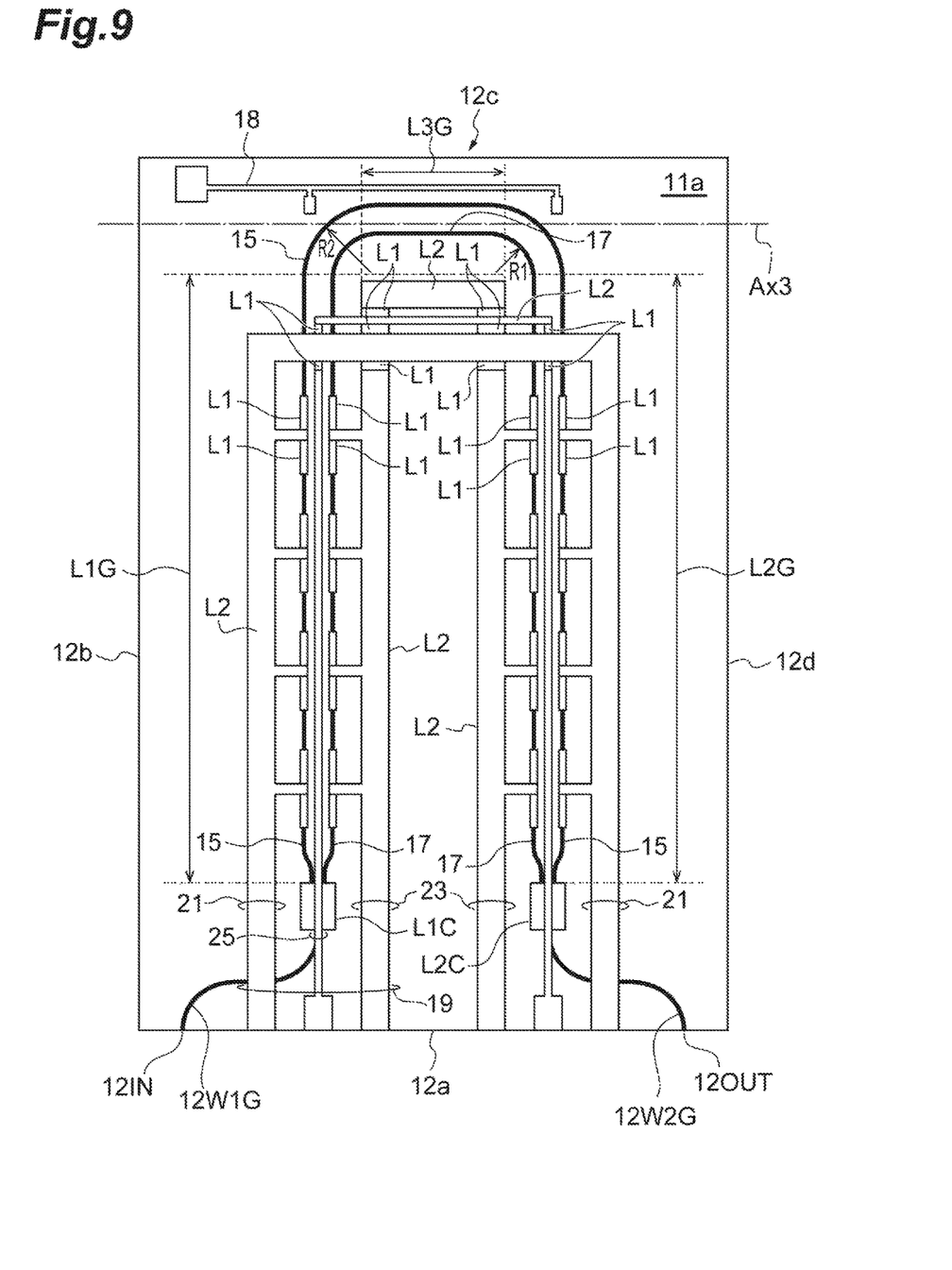
FIG. 9 is a schematic view showing the structure of a Mach-Zehnder modulator according to the embodiment.

FIG. 9 is a schematic view showing the structure of a Mach-Zehnder modulator according to an embodiment. The Mach-Zehnder modulator according to the embodiment includes a 180-degree folded arm waveguide, and a transmission line having a grade separation allowing a folded differential transmission line. In this Mach-Zehnder modulator, the straight portions of the arm waveguides have lengths L1G and L2G of one millimeter and each have a length L3G of 0.2 millimeter. The inner arm waveguide has a curvature radius (R1) of 0.04 millimeters, and the outer arm waveguide has a curvature (R2) of 0.06 millimeters. The lower conductor layer M1 has a thickness of 2 micrometers and is made of Au. The upper conductor layer M2 has a thickness of 5 micrometers and is made of Au.

Figure 10A:
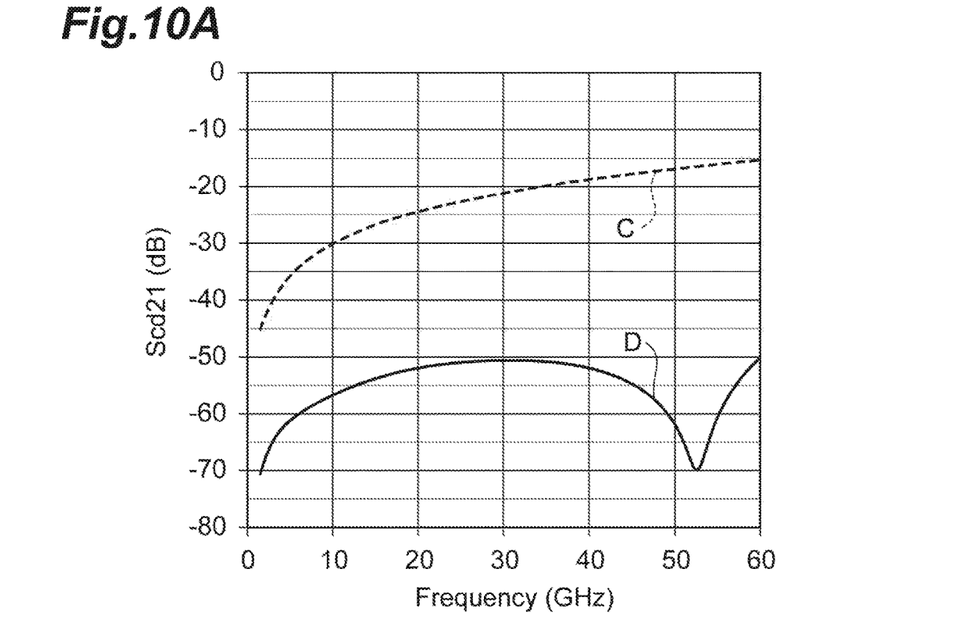
FIG. 10A is a graph showing the high frequency characteristics of the Mach-Zehnder modulator shown in FIG. 9.
Figure 10B:
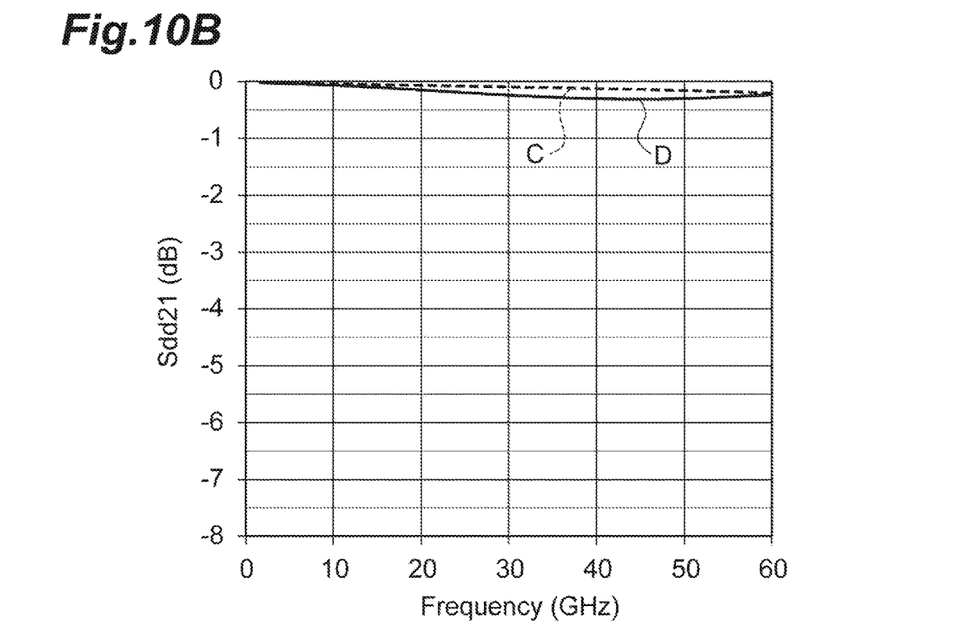
FIG. 10B is a graph showing the high frequency characteristics of a Mach-Zehnder modulator that has 180-degree folded arm waveguides and a differential transmission path for driving the folded arm waveguides without crossing transmission conductors

FIGS. 10A and 10B show high-frequency characteristics of the Mach-Zehnder modulator shown in FIG. 9 and a Mach-Zehnder modulator including both 180-degree folded arm waveguides and a differential transmission line which does not have any grade separation of signal and referential conductors. FIG. 10A shows the frequency characteristics of the conversion ratio (Scd21) of the differential mode to the common mode. This conversion from the differential mode to the common mode results from inter-line skew in the differential transmission line. The characteristics Scd21 of the transmission line according to the example (D) is lower than the transmission line according to the example (C), and specifically, the characteristics (Scd21) in the example (D) is −51 dB at 30 GHz, whereas the characteristics Scd21 in the example (C) is −21 dB thereat. The characteristics Scd21 is preferably −30 dB or less. The transmission line according to the embodiment exhibits a small skew between the conductors in the differential signal line.

FIG. 10B shows the characteristics (Sdd21), specifically the frequency characteristics of the transmittance in the differential mode. The transmission line structures of the examples (C) and (D) each have an Sdd21 of −0.5 dB or more. These graphs show that the transmission line structure (D) according to the embodiment has less occurrence of the generation of a common mode to make the transmission of the differential mode excellent.

The above-described embodiment provides a Mach-Zehnder modulator having a reduced signal skew in a differential signal line which drives folded arm waveguides thereof.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. A Mach-Zehnder modulator comprising:
a first arm waveguide including a first waveguide portion, a second waveguide portion and a third waveguide portion, the first waveguide portion extending in a direction of a first axis, the second waveguide portion extending in a direction of a second axis, and the third waveguide portion being curved so as to optically couple the first waveguide portion to the second waveguide portion;
a second arm waveguide including a first waveguide portion, a second waveguide portion and a third waveguide portion, the first waveguide portion of the second arm waveguide extending in the direction of the first axis, the second waveguide portion of the second arm waveguide extending in the direction of the second axis, the third waveguide portion of the second arm waveguide being curved so as to optically couple the first waveguide portion of the second arm waveguide to the second waveguide portion of the second arm waveguide, and the direction of the first axis being different from that of the second axis; and a differential signal line including a first signal conductor, a second signal conductor, and a reference potential conductor, the first signal conductor and the second signal conductor being coupled to drive the first arm waveguide and the second arm waveguide, respectively, the reference potential conductor having a first conductor portion extending in the direction of the first axis, and an intersecting conductor portion connected to the first conductor portion thereof, the first signal conductor having a first conductor portion extending in the direction of the first axis and connected to the first waveguide portion of the first arm waveguide, and a first intersecting conductor portion connected to the first conductor portion thereof, the second signal conductor having a first conductor portion extending in the direction of the first axis and connected to the first waveguide portion of the second arm waveguide, and a second intersecting conductor portion connected to the first conductor portion thereof, one of the first intersecting conductor portion and the second intersecting conductor portion including an upper conducting layer, the other of the first intersecting conductor portion and the second intersecting conductor portion including a lower conducting layer, and the upper conducting layer extending on the lower conducting layer apart from the lower conducting layer.

2. The Mach-Zehnder modulator according to claim 1, wherein the intersecting conductor portion and the first intersecting conductor portion cross with each other to build a grade separation of the first signal conductor and the reference potential conductor.

3. The Mach-Zehnder modulator according to claim 1, wherein the intersecting conductor portion and the second intersecting conductor portion cross with each other to build a grade separation of the second signal conductor and the reference potential conductor.

4. The Mach-Zehnder modulator according to claim 1, wherein the first intersecting conductor portion of the first signal conductor extends in a direction of a third axis intersecting the direction of the first axis and the direction of the second axis to extend on the second arm waveguide and the second intersecting conductor portion of the second signal conductor.

5. The Mach-Zehnder modulator according to claim 4, wherein the second intersecting conductor portion of the second signal conductor has a part that extends from the first conductor portion of the first signal conductor in the direction of the third axis.

6. The Mach-Zehnder modulator according to claim 4, wherein the first intersecting conductor portion of the first signal conductor extends on the intersecting conductor portion of the reference potential conductor.

7. The Mach-Zehnder modulator according to claim 4, wherein the intersecting conductor portion of the reference potential conductor has a part that extends on the second intersecting conductor portion of the second signal conductor in the direction of the third axis.

8. The Mach-Zehnder modulator according to claim 1, wherein the second intersecting conductor portion of the second signal conductor has a part that extends on the intersecting conductor portion of the reference potential conductor in the direction of the first axis.

9. The Mach-Zehnder modulator according to claim 1, wherein the first conductor portion of the first signal conductor, the first conductor portion of the reference potential conductor, and the first conductor portion of the second signal conductor are arranged to form an SGS structure.

* * * * *